G. W. Ludlow,
Shoe Upper.
No. 1,567. Reissued Nov. 10, 1863.
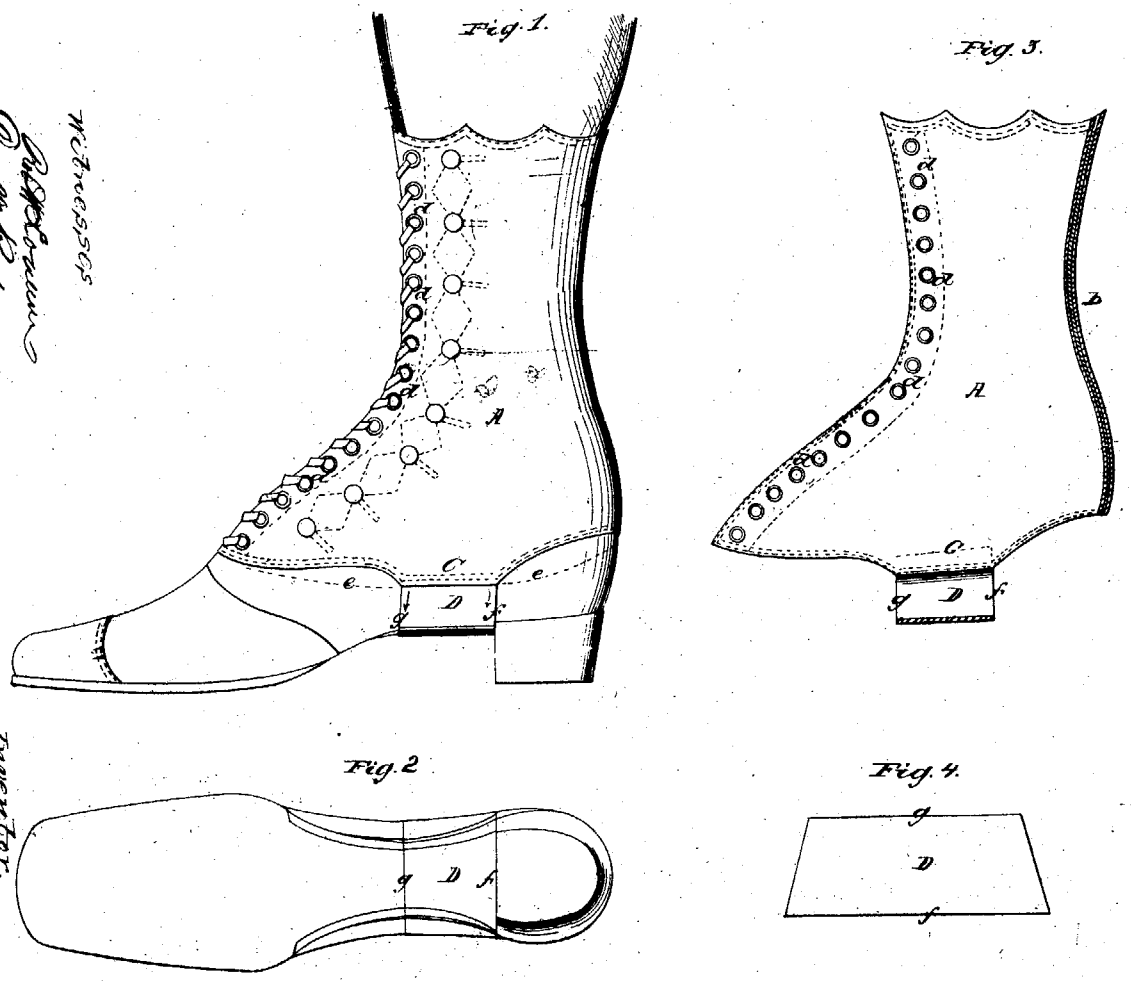
Witnesses:
R. H. Loomis
Geo. W. Reed
Inventor.
George W. Ludlow

UNITED STATES PATENT OFFICE.

GEORGE W. LUDLOW, OF ELIZABETH, NEW JERSEY.

IMPROVEMENT IN GAITERS.

Specification forming part of Letters Patent No. 38,235, dated April 21, 1863; Reissue No. 1,567, dated November 10, 1863.

*To all whom it may concern:*

Be it known that I, GEORGE W. LUDLOW, of Elizabeth, in the county of Union and State of New Jersey, have invented a new and useful Improvement in Gaiterettes; and I do hereby declare that the following is a full, clear, and exact description of the same, reference being had to the accompanying drawings forming a part of this specification, in which—

Figure 1 represents a side elevation of my invention, showing its application to the foot. Fig. 2 is an inverted plan of the same. Fig. 3 is a vertical central section of the gaiterette detached. Fig. 4 is a detached plan of the shank-strap.

Similar letters of reference in the several views indicate corresponding parts.

This invention consists in the arrangement of two flaps on the sides of the gaiterette, and projecting from its lower edge, in combination with the shank-strap, in such a manner that the opening through which the heel passes is enlarged, and consequently the introduction of the heel is facilitated, and at the same time the lower edge of the gaiterette is drawn up tight to the surface of the shoe and held in close contact throughout, and cutting the shank-strap in the form of a trapezoid, that side next to the heel being the longest, to correspond to the varying width of the sole, in such a manner that an even strain is exerted by said shank-strap on the gaiterette, and the strap itself as well as the lower edge of said gaiterette are drawn up tight to the surface with which they are in contact.

To enable those skilled in the art to make and use my invention, I will proceed to describe it.

A represents a gaiterette made of enameled or "patent" leather, or of cloth or any other suitable material, and lined with kid or morocco, or fitted up in any other desirable manner to give a good finish. It is made of two pieces or parts, exclusive of the shank-strap, one part being cut out in the shape represented in Fig. 1, and the other in the shape represented in Fig. 3, and the two parts are hemmed together at the back and provided with eyelets *d* in front, which, in connection with a suitable string or lace, serve to fasten the gaiterette to the foot.

B is a spring, which is inserted into the back seam, being fastened by means of clasps, or in any other suitable manner. It extends from the heel up to the top edge of the gaiterette, and when the said gaiterette is applied to the foot and laced up the spring gradually conforms to the heel and ankle, at the same time preventing the gaiterette from wrinkling and creasing in those parts contiguous to the back seam. In short, the spring acts as a support and keeps the gaiterette always in position despite any movement of the ankle occasioned by walking, &c.

The lower edge of the gaiterette is cut with two flaps, C—one on each side of the foot—and to these flaps the shank-strap D is attached. Ordinarily the lower edge of gaiters or gaiterettes is cut out in a continuous curve, as indicated by the dotted line *e* in Fig. 1. This method of cutting is attended with two disadvantages: First, the opening for the heel of the shoe is so small that the shank-strap has to be attached either by buttons or buckles, or that the same has to be made inelegantly long; second, the strain of the shank-strap being in the direction of the arrow in Fig. 1, and at an angle of rather less than ninety degrees with the edge of the gaiter, cannot keep said edge in close contact with the shoe, and the foot looks clumsy. Both these difficulties are overcome by the side flaps, C.

The opening for the heel is sufficiently large to allow of introducing the same with convenience and without an adjustable fastening of the shank-strap or an inelegant increase of its length, and the direction of the strain exerted by the shank-strap on the edge of the gaiter, being at an obtuse angle with said edge, is capable of keeping the same close to the surface of the shoe, thus preserving the elegant appearance of the foot.

The shank-strap D is cut out in the form of a trapezoid, as clearly shown in Fig. 4 of the drawings, and it is secured to the gaiterette so that the longest side, *f*, is situated next to the heel. The proportion between the sides *f* and *g* of the strap corresponds to the decrease in the width of the sole from the heel forward, as clearly shown in Fig. 2. By these means the shank-strap is made to fit closely throughout its whole width to the sole and to the sides of the shoe to which it may be applied, and no dirt is allowed to get under it.

I am aware that the same effect can be produced with a shank-strap cut out in the shape of a rectangle simply by making the lap on one side longer than on the other. In this case, however, the correctness of the work is left to chance, and depends entirely upon the skill, or, more properly speaking, upon the guess, of the person engaged in sewing on the straps.

By cutting the straps in a trapezoidal form according to my invention the lap is even throughout the entire width of the strap, and a perfect fit is effected without fail.

The spring B is not essential to the invention, and may be dispensed with, if preferred.

What I claim is—

As a new article of manufacture, a gaiterette, A, constructed, as hereinbefore described, with flaps or projections C, connected by a shank-strap, D, of trapezoidal form.

GEORGE W. LUDLOW.

Witnesses:
ROBT. W. LOWDEN,
GEO. W. REED.